US012624963B2

(12) United States Patent (10) Patent No.: US 12,624,963 B2
Fox-Rabinovitz (45) Date of Patent: *May 12, 2026

(54) SYSTEMS AND METHODS FOR CALIBRATION OF AN INERTIAL MEASUREMENT SYSTEM OF A VEHICLE

(71) Applicant: TORC Robotics, Inc., Blacksburg, VA (US)

(72) Inventor: Joseph Fox-Rabinovitz, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 364 days.

This patent is subject to a terminal disclaimer.

(21) Appl. No.: 18/336,699

(22) Filed: Jun. 16, 2023

(65) Prior Publication Data

US 2024/0418537 A1 Dec. 19, 2024

(51) Int. Cl.
*G01C 25/00* (2006.01)
*G01C 21/16* (2006.01)
*H04W 4/46* (2018.01)
(52) U.S. Cl.
CPC ......... *G01C 25/005* (2013.01); *G01C 21/165* (2013.01); *H04W 4/46* (2018.02)
(58) Field of Classification Search
CPC ...................................................... H04W 4/46
See application file for complete search history.

(56) References Cited

U.S. PATENT DOCUMENTS

2008/0195316 A1 * 8/2008 Krishnaswamy ...... G05D 1/027
348/E5.066
2020/0124447 A1 * 4/2020 Schwindt ............. G01D 18/002
2024/0244546 A1 * 7/2024 Abir ...................... H04B 17/27

FOREIGN PATENT DOCUMENTS

DE 102020212142 A1 * 3/2022 ............. G01S 7/497
JP H07301641 A 11/1995
TW I285000 B * 8/2007
WO WO-2022085904 A1 * 4/2022 ............. B60W 60/00

OTHER PUBLICATIONS

"Commercial Vehicle Turntables", Retrieved from Internet: https://www.macton.com/truck-turntables, Published 2017.
"EMI, RFI and EMC and AND Radar Turntables", Retrieved from Internet: https://www.macton.com/emi-rfi-emc -radar-turntables, Published 2017.
"Turnkey Construction Vehicle Assembly Line", Retrieved from Internet: https://www.redviking.com/industries/heavy -equipment/Turnkey-Construction-Vehicle-Assembly-Line_PJ30. html, Published 2023.

* cited by examiner

*Primary Examiner* — Shelby A Turner
*Assistant Examiner* — Cynthia L Davis
(74) *Attorney, Agent, or Firm* — Armstrong Teasdale LLP

(57) ABSTRACT

Aspects of this technical solution can include obtaining, from a first vehicle at a second vehicle by a communication interface coupled with the first vehicle and the second vehicle, first data indicating a positioning of an antenna of a location sensor of the first vehicle, obtaining, from the first vehicle at the second vehicle by the communication interface, second data of the first vehicle indicating a physical location of the first vehicle, during movement of the first vehicle caused by the second vehicle, and generating, at the second vehicle during the movement of the first vehicle and based on the first data and the second data, third data corresponding to a calibration of the physical location of the first vehicle.

20 Claims, 6 Drawing Sheets

100

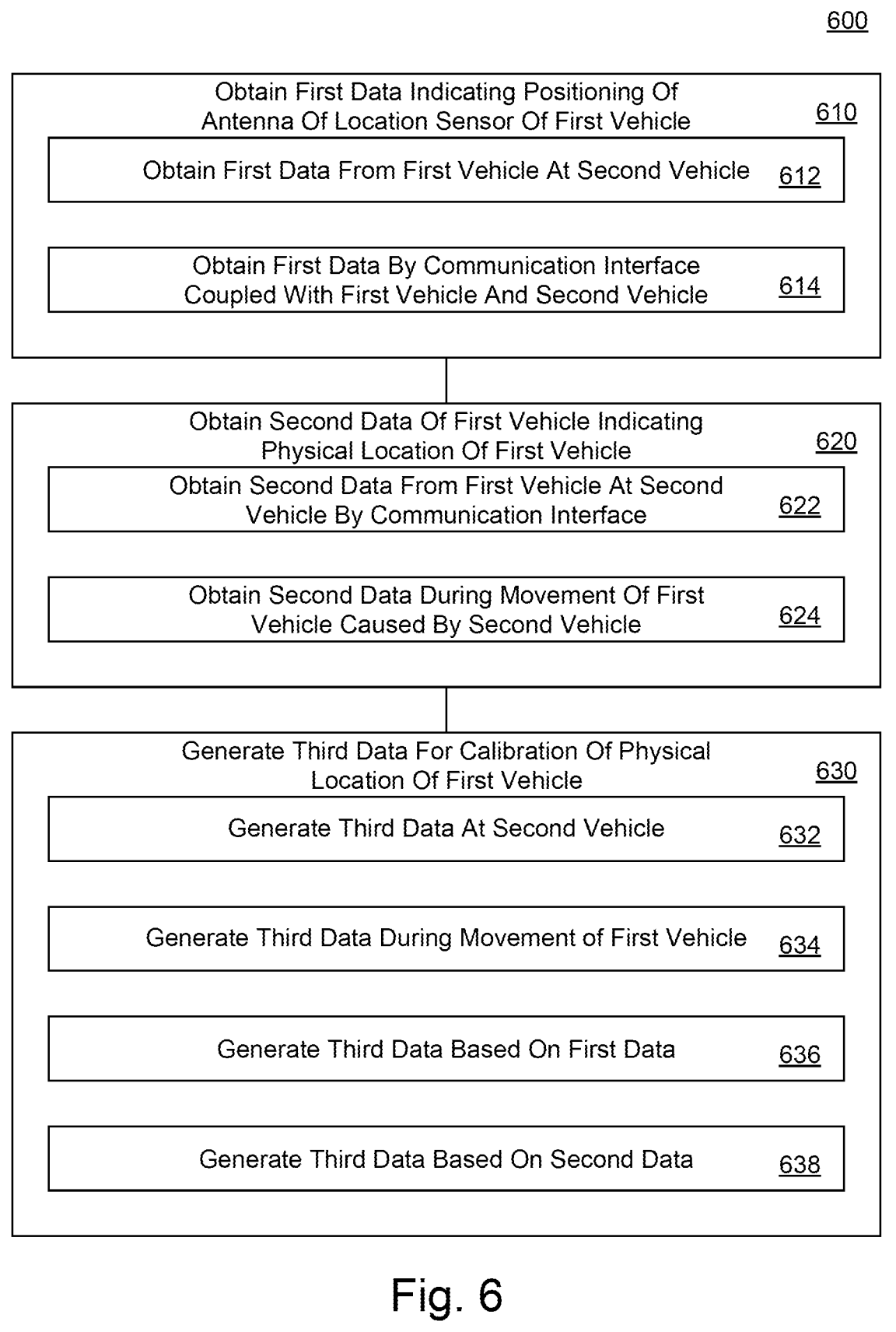

600

Obtain First Data Indicating Positioning Of
Antenna Of Location Sensor Of First Vehicle        610

Obtain First Data From First Vehicle At Second Vehicle        612

Obtain First Data By Communication Interface
Coupled With First Vehicle And Second Vehicle        614

Obtain Second Data Of First Vehicle Indicating
Physical Location Of First Vehicle        620

Obtain Second Data From First Vehicle At Second
Vehicle By Communication Interface        622

Obtain Second Data During Movement Of First
Vehicle Caused By Second Vehicle        624

Generate Third Data For Calibration Of Physical
Location Of First Vehicle        630

Generate Third Data At Second Vehicle        632

Generate Third Data During Movement of First Vehicle        634

Generate Third Data Based On First Data        636

Generate Third Data Based On Second Data        638

Fig. 6

SYSTEMS AND METHODS FOR CALIBRATION OF AN INERTIAL MEASUREMENT SYSTEM OF A VEHICLE

TECHNICAL FIELD

The present implementations relate generally to sensor systems, including but not limited to the calibration of an inertial measurement system of a vehicle.

BACKGROUND

The accuracy of measurements collected during operation of a vehicle can depend on the initial parameters or initial configuration for the devices used to collect the measurements. However, conventional systems cannot accurately configure vehicles without causing significant wear and tear.

SUMMARY

This technical solution is directed at least to calibration of one or more sensors associated with a vehicle during movement of the vehicle, whether or not the vehicle is self-propelled. This technical solution enables the extrinsic, or real-time, calibration of vehicle sensors based on real-world data without driving the vehicle (e.g., without adding to the hours of operation for, or increasing the odometer mileage of, the vehicle). For example, this technical solution allows the calibration of a vehicle location sensor based on real-world location data collected by the location sensors of the vehicle while being transported and, therefore, without adding mileage to the vehicle. Thus, a technical solution for calibration of one or more sensors, including physical orientation sensors, of a vehicle is provided.

At least one aspect is directed to a method of calibration of a positioning system of a vehicle. The method can include obtaining, from a first vehicle at a second vehicle by a communication interface coupled with the first vehicle and the second vehicle, first data indicating a positioning of an antenna of a location sensor of the first vehicle. The method can include obtaining, from the first vehicle at the second vehicle by the communication interface, second data of the first vehicle indicating a physical location of the first vehicle, during movement of the first vehicle caused by the second vehicle. The method can include generating, at the second vehicle during the movement of the first vehicle and based on the first data and the second data, third data corresponding to a calibration of the physical location of the first vehicle.

At least one aspect is directed to a system of calibration of a positioning system of a vehicle. The system can include a memory coupled with one or more processors configured. The system can obtain, from a first vehicle at a second vehicle by a communication interface coupled with the first vehicle and the second vehicle, first data indicating a positioning of an antenna of a location sensor of the first vehicle. The system can obtain, from the first vehicle at the second vehicle by the communication interface, second data of the first vehicle indicating a physical location of the first vehicle, during movement of the first vehicle caused by the second vehicle. The system can generate, at the second vehicle during the movement of the first vehicle and based on the first data and the second data, third data corresponding to a calibration of the physical location of the first vehicle.

At least one aspect is directed to a system of calibration of a positioning system of a vehicle. The system can include a vehicle can include a memory and one or more processors configured. The system can obtain, from an external vehicle at the vehicle by a communication interface coupled with the vehicle and the external vehicle, first data indicating a positioning of an antenna of a location sensor of the external vehicle. The system can obtain, from the external vehicle at the vehicle by the communication interface, second data of the external vehicle indicating a physical location of the external vehicle, during movement of the external vehicle caused by the vehicle. The system can generate, at the vehicle during the movement of the external vehicle and based on the first data and the second data, third data corresponding to a calibration of the physical location of the external vehicle.

BRIEF DESCRIPTION OF THE FIGURES

These and other aspects and features of the present implementations are depicted by way of example in the figures discussed herein. Present implementations can be directed to, but are not limited to, examples depicted in the figures discussed herein.

FIG. 6 depicts a method of calibration of physical orientation of a vehicle, in accordance with present implementations.

DETAILED DESCRIPTION

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

The accuracy of measurements performed by sensors affixed to a rigid body, such as the strapdown sensors affixed to the body of an autonomous vehicle, is dependent on the quality of the extrinsic calibration of the sensors. Typical calibration systems rely on sensor excitation, which normally requires operations that impose wear and tear on the vehicle. As this is unacceptable in scenarios where a vehicle is being delivered in brand new condition to a customer. Calibration of vehicle systems can involve, or depend upon sensor data obtained by or at a vehicle during motion of the vehicle. However, operating a vehicle to calibrate sensor by, for example, driving the vehicle to capture sensor data, can cause undesirable wear or mileage that reduced operable lifespan of a vehicle prematurely. This technical solution is directed at least to calibration of one or more sensors associated with a vehicle during movement of the vehicle, whether or not the vehicle is self-propelled (e.g., while the vehicle is transported, or towed, by another vehicle). This technical solution enables the extrinsic calibration of vehicle sensors, which may include calibration using real-world data that is collected by the vehicle, without adding to the mileage, or other wear and tear, of the vehicle. For example, this technical solution allows the calibration of a vehicle location sensor based on real-world location data collected by the location sensors of the vehicle while it is transported (e.g., towed) by a towing vehicle and, therefore, without adding mileage to the vehicle or otherwise adding to the mileage of the vehicle and without otherwise operating the vehicle beyond customer expectations.

Figure 1:
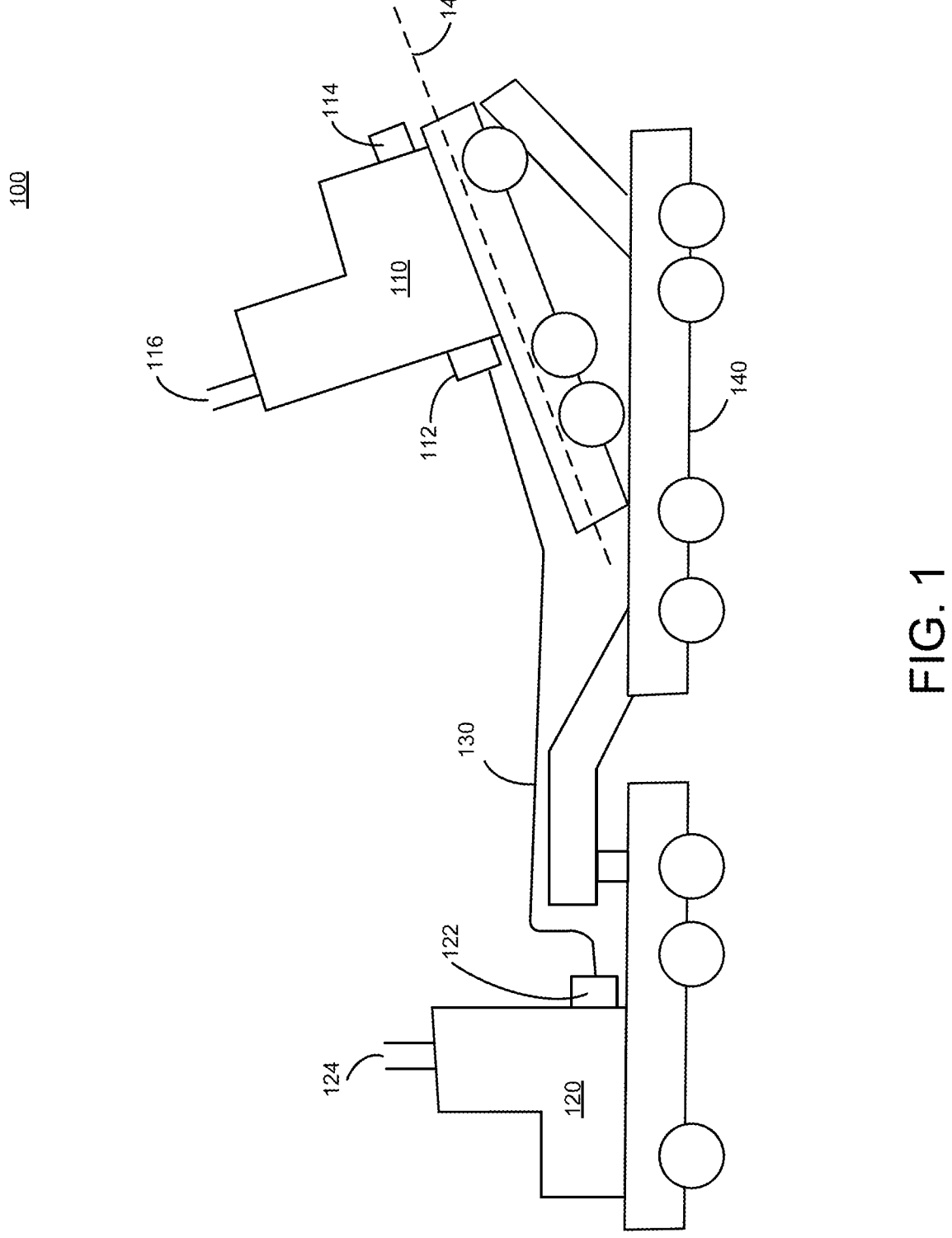
FIG. 1 depicts a vehicle network system, in accordance with present implementations.

FIG. 1 depicts an example vehicle network system, in accordance with present implementations. As illustrated by way of example in FIG. 1, an example vehicle network system 100 can include at least a target vehicle 110, a towing vehicle 120, and a calibration networking cable 130.

The target vehicle 110 can be a newly manufactured (e.g., uncalibrated) vehicle (e.g., an autonomous and/or semi-autonomous vehicle), which may be subject to calibration via the vehicle network system (or towing vehicle 120) during its delivery to a customer, retailer, and/or purchaser associated with the target vehicle 110. The target vehicle 110 can be towed (physically moved) by the towing vehicle 120 via a vehicle trailer 140. The target vehicle 110 can include a rear calibration coupler 112, a forward calibration coupler 114, and geolocation antennae 116.

While this disclosure refers to a target vehicle (e.g., a tractor trailer) 110 and a towing vehicle 120, each of the vehicles 110, 120 can be, in some examples, an autonomous vehicle. For example, the target vehicle 110 and the towing vehicle 120 could each be any type of vehicle including an automobile, a mobile industrial machine, a tractor trailer, and the like. While the disclosure will discuss a self-driving or driverless autonomous system, the autonomous system could alternatively be semi-autonomous having varying degrees of autonomy or autonomous functionality.

The rear calibration coupler 112 can provide communication with one or more sensors and other systems of the target vehicle 110 (e.g., to allow calibration of, or to calibration data from, one or more sensor packages). For example, the rear calibration coupler 112 may enable electronic (e.g., digital) communication between the towing vehicle 120 and an inertial measurement unit ("IMU") of the target vehicle 110. The IMU may be an electronic device that measures and reports one or more features regarding the motion of the target vehicle 110. For example, the IMU may measure a velocity, acceleration, angular rate, and or an orientation of the target vehicle 110 or one or more of its individual components using a combination of accelerometers, gyroscopes, and/or magnetometers. The IMU may detect linear acceleration of the target vehicle 110 using one or more accelerometers and rotational rate using one or more gyroscopes. The IMU may be electrically and electronically coupled (e.g., capable of communicating both electrical power and electronic information) to the rear calibration coupler 112 or one or more sensors of the target vehicle 110, including, for example, coupled to the geolocation antennae 116, to help determine a real-time location of the target vehicle 110 or to enable calibration of the IMU and/or geolocation antennae 116 during movement of the target vehicle 110 (e.g., while it is transported by the towing vehicle 120). The forward calibration coupler 114 can correspond at least partially in one or more of structure and operation to the rear calibration coupler 112. For example, the forward calibration coupler 114 can provide a location for electronic or electrical coupling of the target vehicle 110 at a front thereof.

The geolocation antennae 116 can be positioned on the target vehicle 110 and may be configured to determine a location of the target vehicle 110 via global navigation satellite system (GNSS) (e.g., GPS) data, as described herein. In some examples, the geolocation antennae 116 may include a plurality of antennae and/or GNSS receiver(s) positioned according to one or more different distances and/or other physical parameters (e.g., greater, or less than, the distance shown in FIG. 1). Thus, as can be appreciated, the geolocation antennae 116 are not limited to the specific number, orientation, spacing, and/or position of the antennae shown in FIG. 1. The geolocation antennae 116 may be configured to receive one or more signals from a GNSS (e.g., GPS system) to localize the target vehicle 110 via geolocation. The geolocation antennae 116 may provide an input to and otherwise communicate with a mapping/localization module of the target vehicle 110 to, for example, provide location data for use with one or more digital maps, such as an HD map (e.g., in a vector layer, in a raster layer or other semantic map, etc.). For example, the geolocation antennae 116 (or a corresponding GNSS receiver) may be configured to receive updates from an external network.

The towing vehicle 120 can be a vehicle (e.g., a tractor trailer) capable of physically transporting one or more target vehicles 110 and further configured to communicate with the one or more target vehicles 110 and to calibrate one or more sensors (or sensor systems) during movement of the target vehicles 110 (e.g., while the towing vehicle 120 transports, or tows, the target vehicles 110). The towing vehicle 120 can include a rear calibration coupler 122, and geolocation antennae 124.

The rear calibration coupler 122 can enable communication (e.g., communication of electrical power and digital or analog information) between the towing vehicle 120 and one or more target vehicles (e.g., target vehicle 110). For example, the towing vehicle 120 can be coupled to the target vehicle 110 (or a portion thereof) via rear calibration coupler 112 of the target vehicle 110 and calibration networking cable 130.

The geolocation antennae 124 of the towing vehicle 120 can be configured to determine a location of the towing vehicle 120 via GNSS (e.g., GPS) data, including during transport of the target vehicle 110, and to facilitate the calibration of one or more sensors (e.g., the IMU of target vehicle 110, one or more GPS sensor(s), etc.) of the target vehicle 110, as described herein. In some examples, the geolocation antennae 124 may include a plurality of antennae and/or GNSS receiver(s) positioned according to one or more different distances and/or other physical parameters (e.g., greater, or less than, the distance shown in FIG. 1). Thus, as can be appreciated, the geolocation antennae 124 are not limited to the specific number of antennae, orientation, spacing, and position shown in FIG. 1. The geolocation antennae 124 may be configured to receive one or more signals from a GNSS (e.g., a GPS system) to localize the towing vehicle 120 via geolocation. The geolocation antennae 124 may provide an input to and otherwise communicate with a mapping/localization module of the towing vehicle 120 to, for example, provide location data for use with one or more digital maps, such as an HD map (e.g., in a vector layer, in a raster layer or other semantic map, etc.). For example, the geolocation antennae 124 (or a corresponding GNSS receiver) may be configured to receive updates from an external network.

The calibration networking cable 130 can enable the communication of power and/or information between towing vehicle 120 and one or more target vehicles transported by towing vehicle 120 (e.g., target vehicle 110). In some examples, the calibration networking cable 130 can enable the communication of calibration data collected by one or more sensors of the target vehicle 110 during transport of the target vehicle 110 by the towing vehicle 120.

The vehicle trailer 140 can facilitate the movement of the target vehicle 110 and may include any suitable vehicle transportation trailer. For example, the vehicle trailer 140 need not be specifically designed for either towing vehicle 120 or target vehicle 110 (e.g., vehicle trailer 140 may be an existing towing trailer capable of moving one or more target vehicles). The vehicle trailer 140 can include (e.g., provide) a fixed target vehicle orientation 142. The target vehicle orientation 142 can correspond to a particular physical position and/or angle associated with the physical disposition of the target vehicle 110 (e.g., an angle of target vehicle 110 relative to vehicle trailer 140 and/or towing vehicle 120). In some examples, the target vehicle orientation 142 can correspond to a fixed (e.g., constant), and arbitrary, angle that may be determined for the calibration of one or more sensors of the target vehicle 110 (e.g., an angle determined by the target vehicle 110 or towing vehicle 120 (e.g., as a static offset value) to use in the calibration of one or more sensors of the target vehicle 110). More specifically, in some examples, the towing vehicle 120 can determine the target vehicle orientation 142 based on a gravity vector of the target vehicle 110, which it can then use in the calibration of the target vehicle 110 (e.g., adjusting the calibration of the one or more sensors of the target vehicle 110 to account for the determined vehicle orientation 142).

Figure 2:
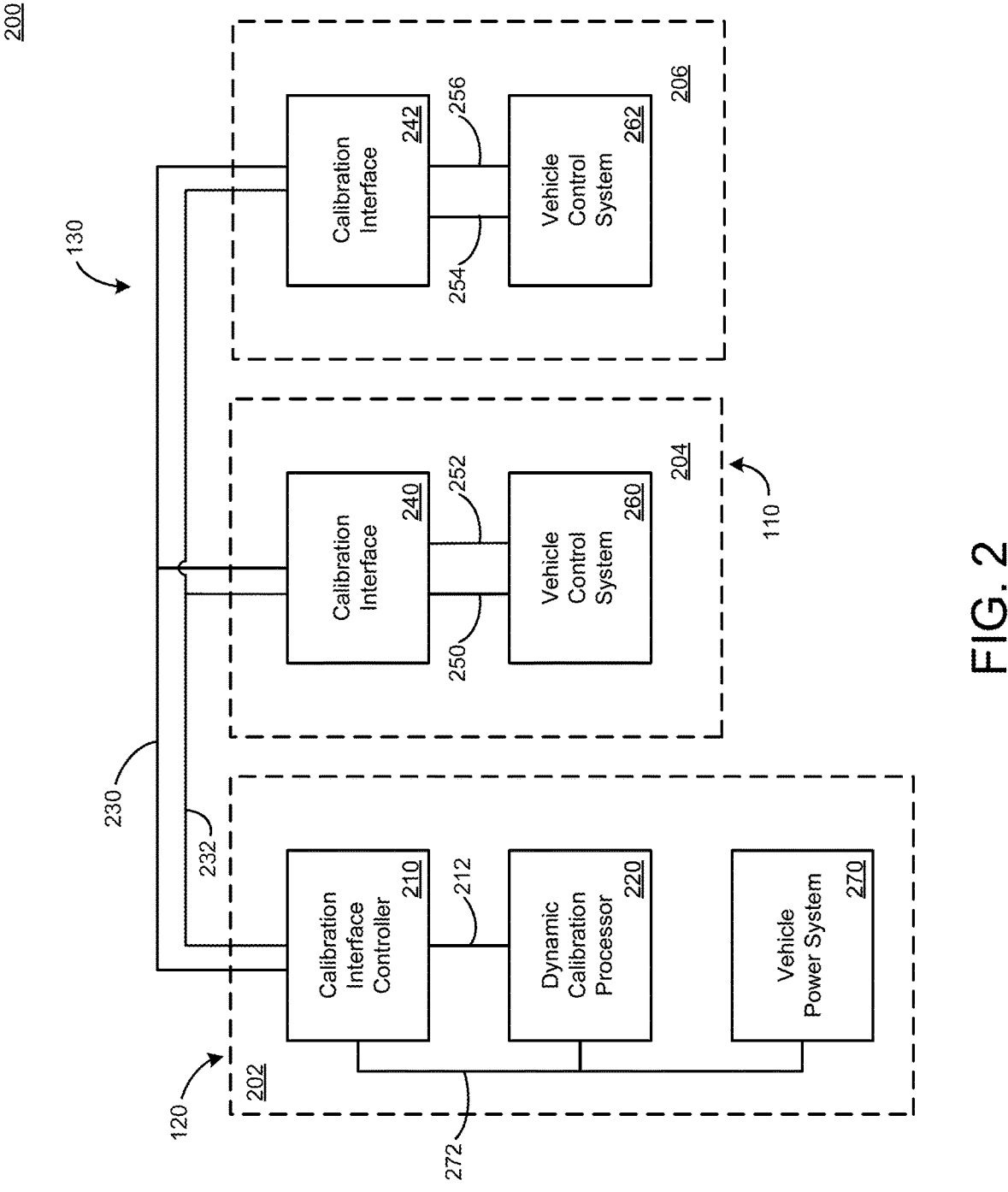
FIG. 2 depicts a vehicle network architecture, in accordance with present implementations.

FIG. 2 depicts an example vehicle network architecture, in accordance with present implementations. As illustrated by way of example in FIG. 2, an example vehicle network architecture 200 can include at least a towing vehicle system 202, a first target vehicle 204, and a second target vehicle 206.

The towing vehicle system 202 can calibrate one or more target vehicles (e.g., target vehicle 110), including the control of any operations of the one or more target vehicles that are necessary to perform the calibration of the target vehicles (e.g., the towing vehicle system 202 can provide power to target vehicle 110 to enable calibration of one or more sensor packages of the target vehicle 110, etc.). The towing vehicle system 202 can include a calibration interface controller 210, a data channel 212, an extrinsic calibration processor 220, a vehicle power system 270, and a power channel 272.

The calibration interface controller 210 can enable communication (e.g., transfer of electrical power and electronic data and/or other information) between the towing vehicle system 202 and one or more target vehicles (e.g., the first and second target vehicles 204, 206). For example, the calibration interface controller 210 can provide power, when needed, to the first and second target vehicles 204, 206 via the power channel 232. The data channel 212 can be configured to enable communication of information (e.g., data, instructions, and/or machine-readable operations) between the extrinsic calibration processors 220 and the calibration interface controller 210. The data channel 212 can enable the calibration interface controller 210 to obtain information (e.g., target vehicle calibration data) collected from, or otherwise transmitted by, a target vehicle (e.g., the first or second target vehicles 204, 206). For example, calibration interface controller 210 may obtain calibration information of a target vehicle during a calibration process performed during the movement of the target vehicle.

The extrinsic calibration processor 220 can control the calibration of one or more sensors of a target vehicle associated with the towing vehicle 202 (e.g., the first and second target vehicles 204, 206). The extrinsic calibration processor 220 can include memory containing machine-readable instructions for the performance of one or more calibration processes for the sensors of a target vehicle. For example, the extrinsic calibration processor 220 can implement one or more programs (e.g., stored in memory) to calibrate an inertial measurement system ("IMU") associated with a target vehicle towed by the towing vehicle system 202. In some examples, the extrinsic calibration processor 220 can implement one or more sub-routines associated with the calibration of one or sensors of a target vehicle, such as to place a target vehicle, or one or systems of a target vehicle, into a low-power configuration to enable calibration of the same.

The vehicle power system 270 can provide power necessary to operate the towing vehicle system 202 and further, if necessary, to power one or more target vehicles as necessary to calibrate the one or more sensors associated with the one or more target vehicles. For example, the vehicle power system 270 can include a vehicle battery associated with the towing vehicle system 202, which may be configured with sufficient resources (e.g., electric capacity) to power one or more target vehicles to enable the collection of sensor calibration data from the same (e.g., to power-on one or more sensors of the target vehicles to be calibrated by the towing vehicle system 202).

The power channel 272 can enable the towing vehicle 120 to communicate power from the vehicle power system 270 to one or more other components of the towing vehicle 120 (e.g., from the vehicle power system 270 to the calibration interface controller 210 of the towing vehicle 120). For example, the power channel 272 can enable the calibration interface controller 210 to provide power, as needed, to the one or more target vehicles 110 to calibrate one or more sensors of the target vehicles 110 (e.g., to provide power the calibration interface and vehicle control systems of the target vehicle 110).

The target vehicle 204 can be a vehicle that is physically towed by the towing vehicle associated with towing vehicle system 202 (e.g., the target vehicle 110 towed by towing vehicle 120) that includes one or more sensors to be calibrated by the towing vehicle system 202. The target vehicle 204 can include a calibration interface 240, a data channel 250, a power channel 252, and a vehicle control system 260.

The calibration interface 240 can enable communication (e.g., two-way transfer of electrical power and electronic information, including machine-readable instructions, etc.) between the calibration interface controller 210 or the towing vehicle system 202 generally and the target vehicle 204 (e.g., transfer of inertial measurement data collected by the target vehicle 204 to be used by the towing vehicle system 202 to calibrate the inertial measurement system, or its component sensors, of the target vehicle 204). The calibration interface 240 is depicted as a single module in FIG. 2, but can be any combination of software agents and/or hardware modules able to generate vehicle control signals operative to monitor systems and control various vehicle operations of the target vehicle 204 as necessary to perform the calibration of one or more sensors (e.g., an inertial measurement system and/or GNSS) of the target vehicle 204 and according to the operation of the extrinsic calibration processor 220.

The data channel 250 can enable communication of information (e.g., sensor data and/or machine-readable instructions) between the vehicle control system 260 and the calibration interface 240. The power channel 252 can enable the calibration interface 240 to provide power from the towing vehicle system 202 (e.g., power received from the vehicle power system 270 via the power channel 232) for the target vehicle 204 to operate at least the systems and/or components necessary to calibrate the sensors of the target vehicle 204 (e.g., to place the target vehicle 204 in a low-power, or calibration, mode). In some examples, the data channel 250 and the power channel 252 together can comprise a single calibration networking cable (e.g., each may be configured as components of the calibration networking cable 130, depicted in FIG. 1).

The vehicle control system 260 be communicatively and operatively coupled (e.g., via data channel 250 and power channel 252) to a plurality of vehicle operating systems, including calibration interface 240, and may execute one or more control signals and/or schemes to control operation of the one or more operating systems, for example, the vehicle control system 260 may control one or more of a vehicle inertial measurement system (or one or more sensors of a vehicle inertial measurement system), a vehicle GNSS system, a steering system, and/or any other sensor systems, including according to operations received from the calibration interface controller 210 (e.g., via the data channel 230). The steering system may be any combination of mechanisms configured to adjust the heading or direction of the truck. The brake system may be, for example, any combination of mechanisms configured to decelerate the truck (e.g., friction braking system, regenerative braking system, etc.) The vehicle control system 260 may be configured to control one or more sensors used by the target vehicle 204 to determine the location of the target vehicle 204 in the environment and may be configured to use one or more system inputs to identify, evaluate, and modify a vehicle trajectory. The vehicle control system 260 is depicted as a single module, but can be any combination of software agents and/or hardware modules able to generate vehicle control signals operative to monitor systems and control various vehicle actuators.

The target vehicle 206 can be a vehicle that is physically towed by the towing vehicle associated with towing vehicle system 202 (e.g., the target vehicle 110 towed by towing vehicle 120) that includes one or more sensors to be calibrated by the towing vehicle system 202 during movement of the target vehicle. The target vehicle 206 can include a calibration interface 242, a data channel 270, a power channel 272, and a vehicle control system 262.

The calibration interface 242 can enable communication (e.g., two-way transfer of data, machine-readable instructions, etc.) between the calibration interface controller 210 or the towing vehicle system 202 generally and the target vehicle 206 (e.g., transfer of inertial measurement data collected by the target vehicle 206 to be used by the towing vehicle system 202 to calibrate the inertial measurement system, or its component sensors, of the target vehicle 206). The calibration interface 242 is depicted as a single module, but can be any combination of software agents and/or hardware modules able to generate vehicle control signals operative to monitor systems and control various vehicle operations of the target vehicle 206 as necessary to perform the calibration of one or more sensors (e.g., an inertial measurement system and/or GNSS) of the target vehicle 206 and according to the operation of the extrinsic calibration processor 220.

The data channel 270 can enable communication of information (e.g., sensor data and/or machine-readable instructions) between the vehicle control system 262 and the calibration interface 242. The power channel 256 can enable the calibration interface 242 to provide power from the towing vehicle system 202 (e.g., power received from the vehicle power system 270 via the power channel 232) for the target vehicle 206 to operate at least the systems and/or components necessary to calibrate the sensors of the target vehicle 206 (e.g., to place the target vehicle 206 in a low-power, or calibration, mode). In some examples, the data channel 270 and the power channel 256 together can comprise a single calibration networking cable (e.g., each may be configured as components of the calibration networking cable 130, depicted in FIG. 1).

The vehicle control system 262 be communicatively and operatively coupled (e.g., via data channel 254 and power channel 256) to a plurality of vehicle operating systems, including calibration interface 242, and may execute one or more control signals and/or schemes to control operation of the one or more operating systems, for example, the vehicle control system 262 may control one or more of a vehicle inertial measurement system, a vehicle GNSS system, a steering system, and/or any other sensor systems, including according to operations received from the calibration interface controller 210 (e.g., via the data channel 230). The steering system may be any combination of mechanisms configured to adjust the heading or direction of the truck. The brake system may be, for example, any combination of mechanisms configured to decelerate the truck (e.g., friction braking system, regenerative braking system, etc.) The vehicle control system 262 may be configured to control one or more sensors used by the target vehicle 206 to determine the location of the target vehicle 206 in the environment and may be configured to use one or more system inputs to identify, evaluate, and modify a vehicle trajectory. The vehicle control system 262 is depicted as a single module but is not limited thereto, and it can be any combination of software agents and/or hardware modules able to generate vehicle control signals operative to monitor systems and control various vehicle actuators.

For example, the system 200 can transmit, from a second vehicle (e.g., the towing vehicle 120) by the communication interface, a third data to a Global Positioning System (GPS) device of the first vehicle (e.g., a GPS device of the target vehicle 110) configured to measure the physical orientation of the first vehicle, the location sensor coupled with the GPS device. And the system 200 can include the first data generated by the location sensor of the first vehicle (e.g., generated by the location sensor(s) of the target vehicle 110) during a stationary state of the first vehicle preceding the movement of the first vehicle (e.g., before the towing vehicle 120 begins to physically transport the target vehicle 110). For example, the system can include the location sensor and can include a plurality of GPS antennas configured to detect a Global Positioning System (GPS) signal, the first data corresponding to a distance between a first GPS antenna and a second GPS antenna among the GPS antennas, and the second data can include one or more of a latitude, longitude, and altitude corresponding to the GPS signal. For example, the system 200 can transmit, from the vehicle (e.g., towing vehicle 120) by the communication interface, the third data to a Global Positioning System (GPS) device of an external vehicle (e.g., target vehicle 110) configured to measure the physical orientation of the external vehicle (e.g., target vehicle 110), the location sensor coupled with the GPS device.

The system 200 can include a second data generated by the location sensor of the first vehicle during the movement of the first vehicle (e.g., generated by the target vehicle 110 while it is physically transported, or towed, by the towing vehicle 120). The system 200 may transmit, during the movement of the first vehicle via the communication interface, electrical power from the second vehicle (e.g., from the towing vehicle 120) at the location sensor device of the first vehicle (e.g., the target vehicle 110) configured to measure the physical location of the first vehicle. The system 200 can activate, during the movement of the first vehicle and in response to the transmitting the electrical power, the location sensor (e.g., the system 200 can activate the location sensor of the target vehicle 110 while it is physically transported by the towing vehicle 120 and in response to the electrical power transmitted by the system 200).

Moreover, the system can generate, at the second vehicle during the movement of the first vehicle and based on a fourth data of the first vehicle indicating a physical orientation of the first vehicle and a fifth data of the first vehicle indicating a direction of gravity relative to a physical orientation of the first vehicle, a sixth data corresponding to a calibration of the physical orientation of the first vehicle. For example, the system can obtain, from the first vehicle at the second vehicle by the communication interface, the fourth data during the movement of the first vehicle. For example, the system can obtain, from the first vehicle at the second vehicle by the communication interface, the fifth data.

Figure 3:
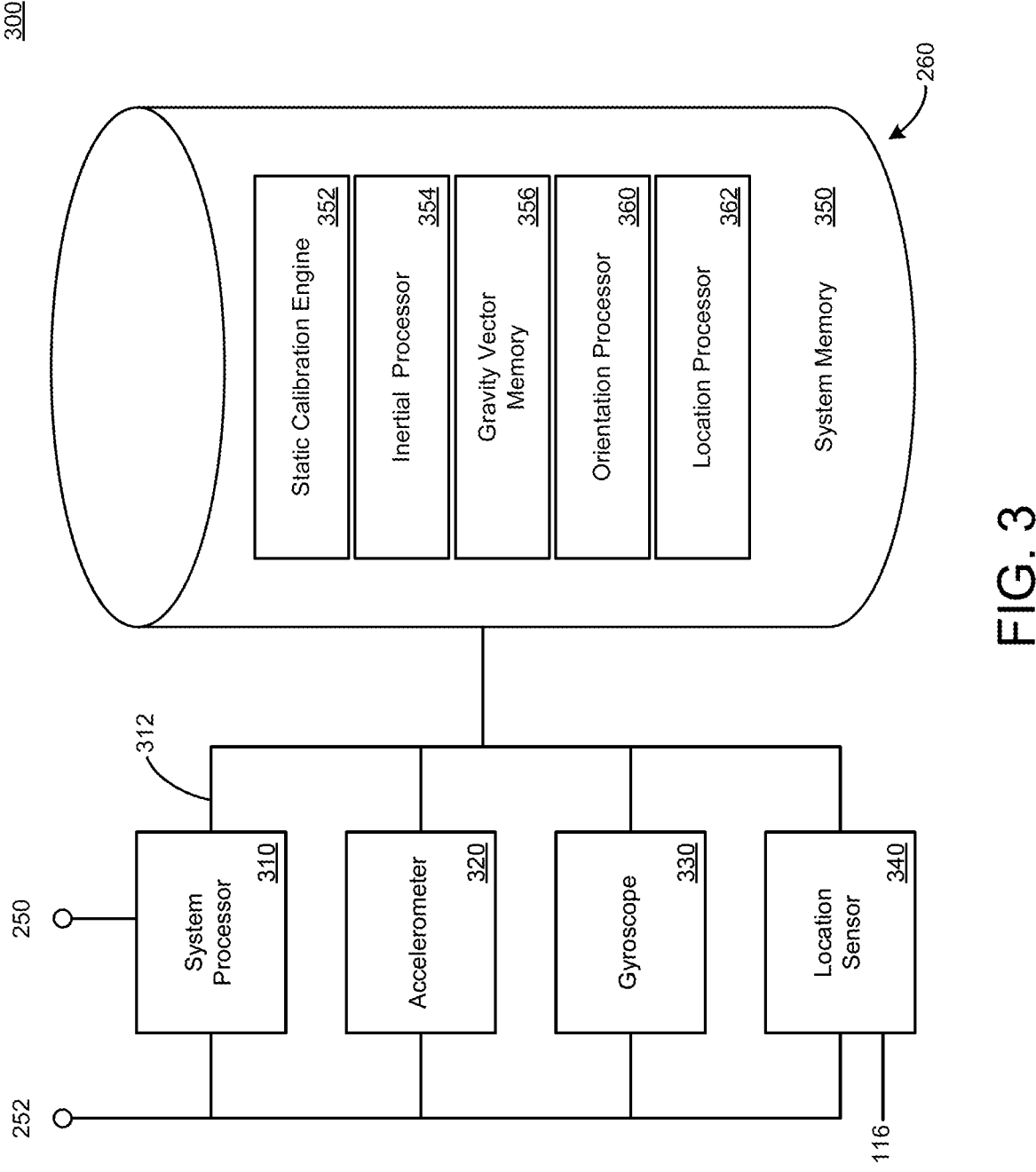
FIG. 3 depicts a vehicle control system, in accordance with present implementations.

FIG. 3 depicts an example vehicle control system, in accordance with present implementations. As illustrated by way of example in FIG. 3, an example vehicle control system 300 can include at least a system processor 310, system bus 312, an accelerometer 320, a gyroscope 330, a location sensor 340, and a system memory 350.

The system processor 310 can execute one or more instructions associated with the operation of the vehicle control system (e.g., one or more instructions associated with the calibration of one or more of the sensors of the vehicle control system 300, including, for example, the accelerometer 320, the gyroscope 330, and the locations sensor 340). The system processor 310 can include an electronic processor, an integrated circuit, or the like including one or more of digital logic, analog logic, digital sensors, analog sensors, communication buses, volatile memory, nonvolatile memory, and the like. The system processor 310 can include, but is not limited to, at least one microcontroller unit (MCU), microprocessor unit (MPU), central processing unit (CPU), graphics processing unit (GPU), physics processing unit (PPU), embedded controller (EC), or the like. The system processor 310 can include a memory operable to store or storing one or more instructions for operating components of the system processor 310 and operating components operably coupled to the system processor 310. For example, the one or more instructions can include one or more of firmware, software, hardware, operating systems, embedded operating systems. The system processor 310, or the vehicle control system 300 generally, can include one or more communication bus controller to effect communication between the system processor 310 and the other elements of the vehicle control system 300. The system bus 312 can enable digital communication (e.g., two-way communication of sensor data and/or machine readable instructions) between the system processor 310, the accelerometer 320, the gyroscope 330, the location sensor 340, and the system memory 350.

The accelerometer 320 can measure an acceleration associated with the vehicle control system 300, including, for example, to determine an approximate location of the vehicle control system based on measured acceleration and a position data measured for the vehicle control system 300 and associated with the measured acceleration (e.g., position data for a known time or timestamp relative to the data output by the accelerometer 320). The gyroscope 330 can measure physical orientation data associated with the vehicle control system 300, including, for example, a slope and/or orientation associated with the vehicle control system 300. The location sensor 340 can include one or more sensors capable of measuring the physical location of the vehicle control system 300 within the environment (e.g., one or more GPS sensors.) The location sensor 340 can be included in, or form part of, a GNSS sensor package of the vehicle control system 300, as described above with reference to geolocation antennae 116 of FIG. 1.

The system memory 350 can store data associated with the operation of the vehicle control system 300, including the operations performed during calibration of one or more sensors associated with the vehicle control system 300 (e.g., accelerometer 320, gyroscope 330, location sensor 340, and the like). The system memory 350 can include one or more hardware memory devices to store binary data, digital data, or the like. The system memory 350 can include one or more electrical components, electronic components, programmable electronic components, reprogrammable electronic components, integrated circuits, semiconductor devices, flip flops, arithmetic units, or the like. The system memory 350 can include at least one of a non-volatile memory device, a solid-state memory device, a flash memory device, or a NAND memory device. The system memory 350 can include one or more addressable memory regions disposed on one or more physical memory arrays. A physical memory array can include a NAND gate array disposed on, for example, at least one of a particular semiconductor device, integrated circuit device, and printed circuit board device. The system memory 350 can include a static calibration engine 352, an inertial processor 354, a gravity vector memory 356, an orientation processor 360, and a location processor 362. Moreover, the system memory 350 can be included in, or a component of, the vehicle control systems 260 and 262.

The static calibration engine 352 can control the calibration of one or more static values associated with one or more sensors of a target vehicle. For example, the static calibration engine can perform a static calibration of, or determine a gravity vector for, the accelerometer 320 of the vehicle control system 300. In some examples, the gravity vector determined by the calibration engine 352 can indicate the direction of gravity, as a static value (e.g., the output of the accelerometer 320 when the vehicle associated with the vehicle control system 300 is at rest and positioned on a level surface).

Figure 5:
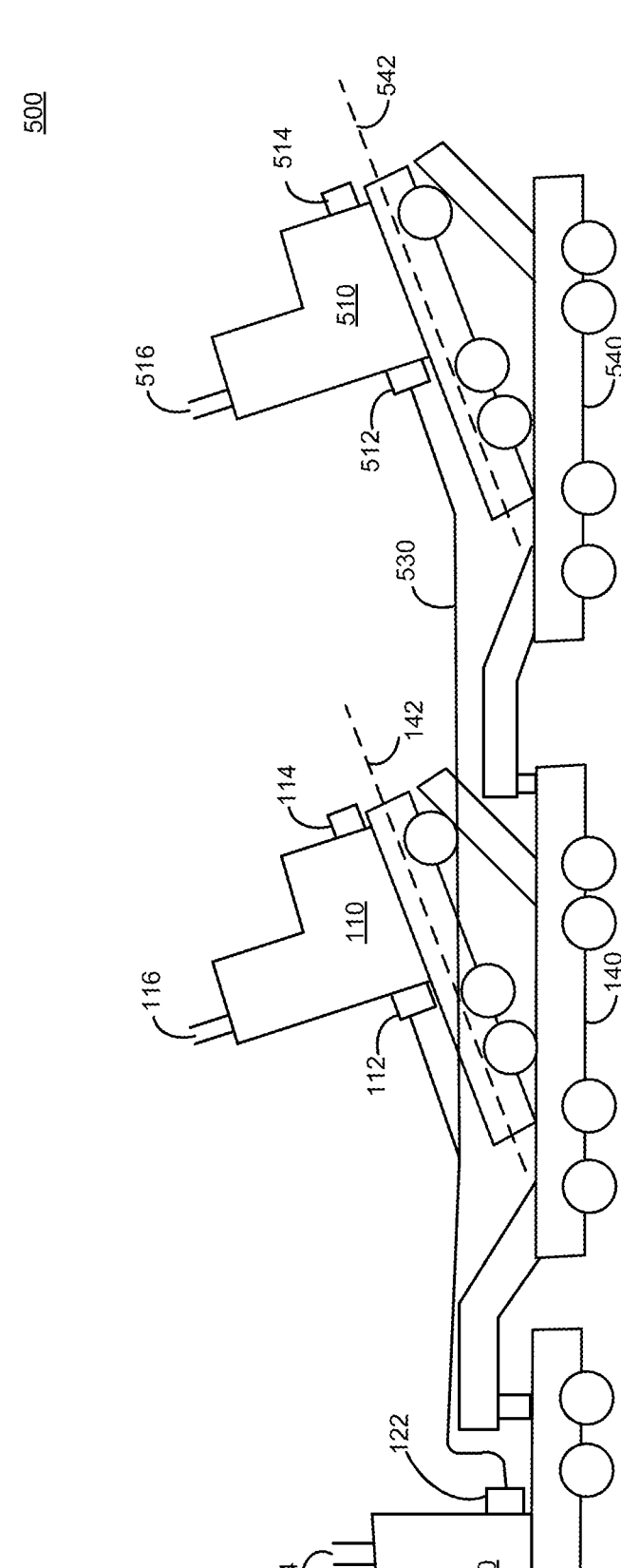
FIG. 5 depicts a multi-vehicle network system, in accordance with present implementations.

For example, the static calibration engine 352 can determine the gravity vector for the accelerometer 320 during one or more calibration processes performed during, or shortly after (e.g., at the factory), the manufacture of the vehicle associated with the vehicle control system 300 (e.g., before the movement of the vehicle associated with the vehicle control system 300, for example, as shown in FIGS. 1 and 5). In some examples, the static calibration engine 352 can determine the gravity vector by collecting a first dataset (e.g., 1-10 minutes of output data) from one or more sensors (e.g., accelerometer 320 and/or location sensor 340) while the vehicle of the vehicle control system 300 is disposed at a first position on a leveled rotating platform, then rotating the vehicle of the vehicle control system 300 by 180 degrees about the vertical axis of the vehicle (e.g., rotating the leveled rotating platform by one half of a complete rotation), collecting a second dataset (e.g., 1-10 minutes of output data) from the accelerometer 320 of the vehicle control system 300, and computing the rotation of the vehicle control system 300 (e.g., the rotation measured by an inertial measurement system associated with the vehicle of the vehicle control system 300) based on the collected first and second datasets to determine an offset value for the pitch and to determine an offset value for the roll (e.g., as measured by the accelerometer and/or inertial measurement system of the target vehicle) relative to the vehicle's physical position in the environment. In some examples, the gravity vector determined by the static calibration engine 352 can comprise the offset values for the pitch and roll relative to the physical position of the vehicle (e.g., the roll offset value and the pitch offset value together may comprise the gravity vector).

For example, the vehicle control system 300 may also include position data (e.g., data output by one or more position (e.g., GPS) sensors of the target vehicle) in the first and second datasets collected from the sensors of the vehicle control system 300 during the calibration performed by the static calibration engine 352. The inertial processor 354 can determine the spatial orientation for the vehicle control system, or the associated vehicle (e.g., target vehicle 110), based on the data output by one or more sensors associated with inertial measurements for the vehicle control system 300 (e.g., one or more of the accelerometer 320, the gyroscope 330, and/or the location sensor 340). The gravity vector memory 356 can contain one or more gravity vectors, or the data associated with a gravity vector, that have been determined for the vehicle control system 300 (e.g., determined by the static calibration engine 352).

The orientation processor 360 can determine a physical orientation associated with the physical disposition of the vehicle control system 300. For example, the orientation processor 360 can determine the first orientation 142 of the target vehicle 110 based on the gravity vector determined during initial calibration (e.g., calibration at the factory where target vehicle 110 was manufactured) and/or data collected during transport of the target vehicle 110 by the towing vehicle 120 (e.g., data output by the accelerometer 320 and/or gyroscope 330). The orientation processor may continuously determine the orientation associated with the vehicle control system 300 at multiple points during the transport of the target vehicle associated with the vehicle control system 300 (e.g., as the target vehicle 110 is transported along a roadway with a surface that is not perfectly level and/or having a slope in one or more directions). Thus the orientation processor 360 can determine an orientation associated with the vehicle control system 300 that is adjusted for the particular orientation associated with the vehicle control system as it is transported to its destination (e.g., during transport to the customer).

The location processor 362 can determine the location of the vehicle control system 300 based on the data output by the location sensor 340 (e.g., data communicated to system memory 350 via the system bus 312.) The location processor 362 can control the operation of the location sensor 340 and interpret the data output by the location sensor 340 to determine one or more locations associated with where the vehicle control system 300 is located within the environment (e.g., as the vehicle control system 300 travels along a roadway).

Figure 4:
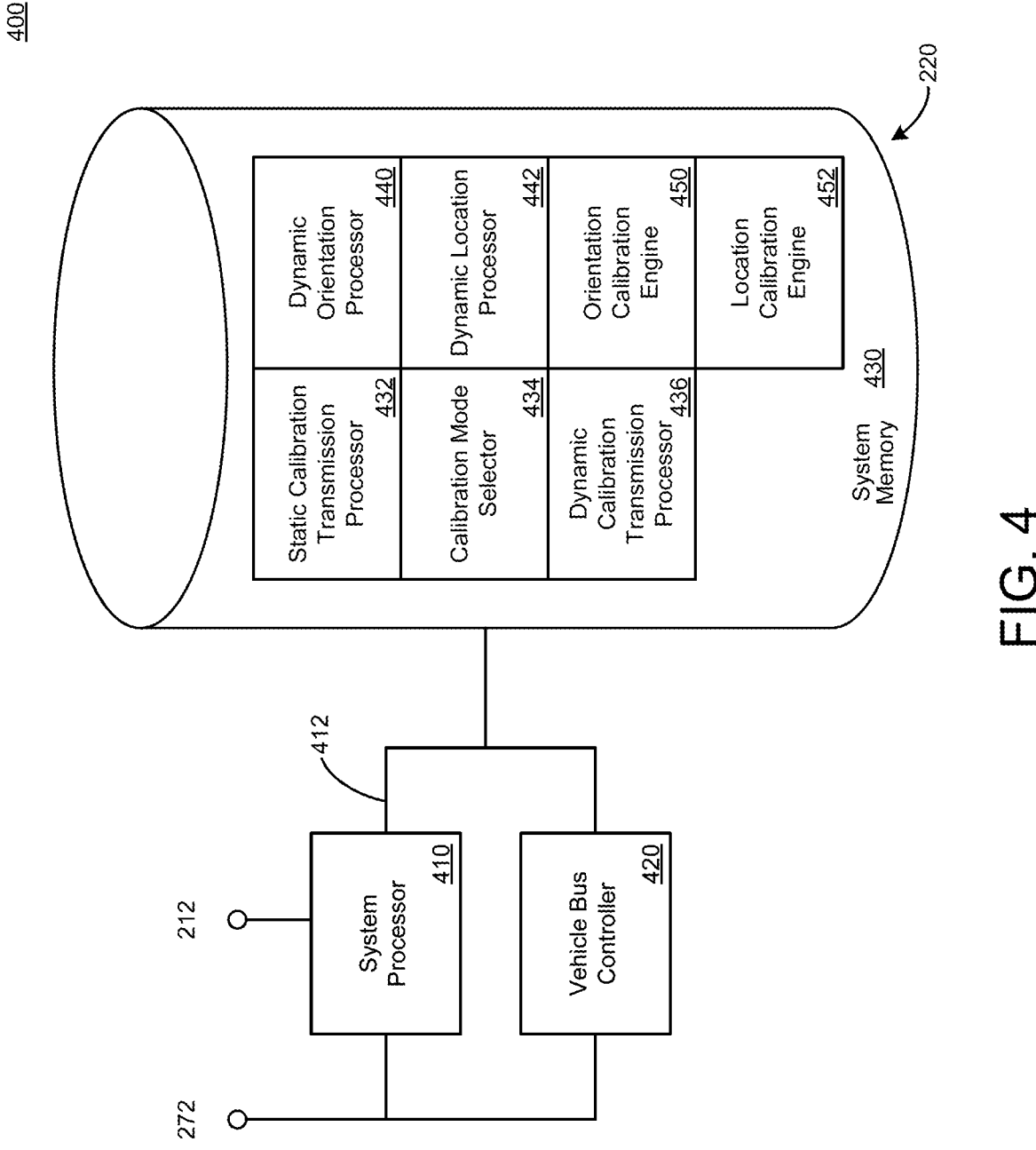
FIG. 4 depicts an extrinsic calibration processor, in accordance with present implementations.

FIG. 4 depicts an example extrinsic calibration processor, in accordance with present implementations. As illustrated by way of example in FIG. 4, an example extrinsic calibration processor 400 can include at least a system processor 410, system bus 412, a vehicle bus controller 420, a static calibration transmission processor 432, a calibration mode selector 434, an extrinsic calibration transmission processor 436, an extrinsic orientation processor 440, an extrinsic location processor 442, an orientation calibration engine 450, and a location calibration engine 452.

The system processor 410 can execute one or more instructions associated with the calibration of one or more sensors of a target vehicle (e.g., the operation of extrinsic calibration processor 400). The system processor 410 can include an electronic processor, an integrated circuit, or the like including one or more of digital logic, analog logic, digital sensors, analog sensors, communication buses, volatile memory, nonvolatile memory, and the like. The system processor 410 can include, but is not limited to, at least one microcontroller unit (MCU), microprocessor unit (MPU), central processing unit (CPU), graphics processing unit (GPU), physics processing unit (PPU), embedded controller (EC), or the like. The system processor 410 can include a memory operable to store or storing one or more instructions for operating components of the system processor 410 and operating components operably coupled to the system processor 410. For example, the one or more instructions can include one or more of firmware, software, hardware, operating systems, embedded operating systems. The system processor 410, or the extrinsic calibration processor 400 generally, can include one or more communication bus controller to effect communication between the system processor 410 and the other elements of the extrinsic calibration processor 400.

The system bus 412 can enable communications and/or data transfer (e.g., two-way transfer of information, data, and/or machine-readable instructions) between the system processor 410, the vehicle bus controller 420, and the system memory 430 or its components and/or modules (e.g., static calibration transmission processor 432, calibration mode selector 434, extrinsic calibration transmission processor 436, etc.). The system bus 412 can be coupled, via the system processor 410, to the data cable 212, which is coupled to the calibration interface controller 210, as described above.

The vehicle bus controller 420 can control the communication that occurs via the system bus 412, including, for example, to determine a target vehicle of a plurality of target vehicles associated with the system 400 for which an extrinsic calibration will be performed by the system 400. For example, the vehicle bus controller 420 can identify the first target vehicle 110 for a first extrinsic calibration and can control communications between the calibration system 400 and the first target vehicle (e.g., to control the communication of instructions and calibration data to and/or from the processor 410 and the calibration interface 240 of the first vehicle 110) data is read from, or written to, the portion of system memory 430 associated with the operation of the system processor 410 at that time (e.g., to transfer data received by system processor 410 via data cable 212 to the corresponding portion of system memory 430 and/or to transfer data from system memory 430 to the data cable 212 via the system processor 410).

The static calibration transmission processor 432 can control the transmission of one or more static calibration values (e.g., a gravity vector) determined for a target vehicle (e.g., at the time or location of manufacture). For example, the static calibration transmission processor 432 can retrieve the gravity vector of a target vehicle (e.g., target vehicle 110) for which the extrinsic calibration will be performed by processor 410. In some examples, the static calibration transmission processor 432 may retrieve the gravity vector from the gravity vector memory 356, via the connection established by data cable 312 and calibration networking cable 130, of the vehicle control system 300 for which the extrinsic calibration will be performed.

The calibration mode selector 434 can determine whether to calibrate one or more sensors of a target vehicle (e.g., target vehicle 110) and can determine specifically which sensor, of one or more sensors available, to calibrate (e.g., an accelerometer, a gyroscope, a location sensor, etc.). Additionally, the calibration mode selector 434 can control the target vehicle, or one or more sensors of the target vehicle, to begin a calibration mode of the target vehicle or its sensor(s). For example, the calibration mode selector 434 can place the target vehicle 110 in a calibration mode to allow the processor 410 to calibrate one or more sensors of the target vehicle 110 (e.g., a gyroscope, accelerometer, and/or location sensor). In addition, the calibration mode selector 434 can control the configuration of the target vehicle(s) to cause the target vehicle to no longer operate in a calibration mode (e.g., to cause the first target vehicle 110 to 'turn off' the calibration interface 240 and/or to disconnect from the power and/or data provided by the calibration networking cable 130).

The extrinsic calibration transmission processor 436 can transfer a completed calibration or determined calibration data (e.g., data output by the calibration mode selector 434) to the target vehicle, or one or more sensor(s) of the target vehicle, for which the extrinsic calibration was performed by system 400. In addition, the extrinsic calibration transmission processor 436 can control the transfer of other information relevant to the completion of the extrinsic calibration, including, for example, the distance between the geolocation antennae 116, which may differ from the distance between the geolocation antennae of the towing vehicle and/or other target vehicle(s) transported by the towing vehicle (e.g., antennae 124, 516)

The extrinsic orientation processor 440 can enable the extrinsic calibration system 400 to receive a stream of sensor data from a target vehicle, or a sensor of the target vehicle, for which an extrinsic calibration is being performed by the system 400. The extrinsic orientation processor 440 can cause the processor 410 to request and/or receive one or more calibration datasets from the target vehicle over a specified period of time (e.g., 1 minute, 10 minutes, 10 hours, etc.) to use for the extrinsic calibration of that target vehicle. For example, the extrinsic orientation processor 440 can cause the system 400 to receive a measurement dataset from one or more of the accelerometer 320 and/or the gyroscope 330 of the first target vehicle 110 during an extrinsic calibration of the same (e.g., while the first target vehicle 110 is being transported to its destination by the towing vehicle 120). More specifically, for example, the extrinsic orientation processor 440 can cause the system 400 to receive calibration data from the accelerometer 320 during a specified period of time during which data from an accelerometer of the towing vehicle 120 is also collected, to use for the extrinsic calibration of the accelerometer 320 according to the accelerometer measurements collected from the towing vehicle 120.

The extrinsic location processor 442 can enable the extrinsic calibration system 400 to receive a stream of location sensor data (e.g., one or more measurement datasets) from a target vehicle, or a location sensor of the target vehicle, to perform an extrinsic calibration of that target vehicle and/or its location sensor (e.g., location sensor 340). For example, the extrinsic location processor 442 can cause the processor 410 to request and/or receive one or more calibration datasets from the target vehicle over a specified period of time (e.g., 1 minute, 10 minutes, 10 hours, etc.) to use for the extrinsic calibration of the location sensor of that target vehicle. For example, the extrinsic location processor 442 can cause the system 400 to collect a measurement dataset from the location sensor 340 of the first target vehicle 110 during an extrinsic calibration of the same (e.g., to collect a stream of location measurements from the location sensor 340 while the first target vehicle 110 is being transported to its destination by the towing vehicle 120).

More specifically, for example, the extrinsic location processor 442 can cause the system 400 to receive calibration data from the location sensor 340, or geolocation antennae 116, during a specified period of time during which data from the location sensor (e.g., geolocation antennae 124) of the towing vehicle 120 is also collected and used for the extrinsic calibration of the location sensor 340 according to the location measurements collected by the towing vehicle 120.

The orientation calibration engine 450 can perform an extrinsic calibration of one or more sensors of the target vehicle (e.g., the accelerometer 320 and/or the gyroscope 330) using the gravity vector (e.g., determined at the factory where the target vehicle was manufactured) and the calibration data collected by the one or more sensors of the target vehicle and communicated to the orientation calibration engine 450 via system bus 412. For example, the orientation calibration engine can determine one or more offset values for the measurement data of a sensor, which may correspond to a baseline of the measurement data output by that sensor (e.g., a value that corresponds to 'zero' or baseline as measured by that sensor).

The location calibration engine 452 can perform an extrinsic calibration of one or more location sensors of a target vehicle (e.g., the location sensor 340, geolocation antennae 116 and 516, and the like) using the gravity vector (e.g., determined at the factory where the target vehicle was manufactured) and the calibration data collected by the one or more location sensors of the target vehicle and similar data collected by the location sensors of the towing vehicle 120 and communicated to the location calibration engine 450 via system bus 412. For example, the orientation calibration engine can determine one or more offset values for the measurement data of the location sensor 340, which may correspond to a baseline of the location data output by that sensor (e.g., a value that corresponds to 'zero' or baseline as it is measured by that sensor).

FIG. 5 depicts an example multi-vehicle network system, in accordance with present implementations. As illustrated by way of example in FIG. 5, an example multi-vehicle network system 500 can include at least a second target vehicle 510, and a calibration networking cable 530.

The second target vehicle 510 can be a newly manufactured (e.g., uncalibrated) vehicle (e.g., an autonomous and/or semi-autonomous vehicle) during its delivery to a customer, retailer, and/or purchaser associated with the second target vehicle 510. The second target vehicle 510 can include a rear calibration coupler 512, a forward calibration coupler 514, geolocation antennae 516, and a second target vehicle orientation 542. The rear calibration coupler 512 can enable communication (e.g., communication of digital and/or analog information) between the towing vehicle 120 and one or more target vehicles (e.g., the second target vehicle 510), for example, via rear calibration coupler 512 and calibration networking cable 530. The forward calibration coupler 514 can correspond at least partially in one or more of structure and operation to the rear calibration coupler 512. For example, the forward calibration coupler 514 can provide a location for electronic or electrical coupling of the second target vehicle 510 at a front thereof.

The geolocation antennae 516 can be configured to determine a location of the towing vehicle 120 via GNSS (e.g., GPS) data during transport of the target vehicle 510 and to facilitate the calibration of one or more sensors (e.g., GPS sensor(s)) of the target vehicle 510, as described herein. In some examples, the geolocation antennae 516 may include a plurality of antennae and/or GNSS receiver(s) positioned according to one or more different distances and/or other physical parameters (e.g., greater, or less than, the distance shown in FIG. 5). Thus, as can be appreciated, the geolocation antennae 516 are not limited to the specific orientation, spacing, and/or position shown in FIG. 5. The geolocation antennae 516 may be configured to receive one or more signals from a GNSS (e.g., a GPS system) to localize the second target vehicle 510 via geolocation. The geolocation antennae 516 may provide an input to and otherwise communicate with a mapping/localization module of the second target vehicle 510 to, for example, provide location data for use with one or more digital maps, such as an HD map (e.g., in a vector layer, in a raster layer or other semantic map, etc.). For example, the geolocation antennae 516 (or a corresponding GNSS receiver) may be configured to receive updates from an external network The second target vehicle orientation 542 can correspond to a particular physical position and/or angle associated with the physical disposition of the second target vehicle 510 (e.g., an angle of the second target vehicle 510 relative to vehicle trailer 140 and/or towing vehicle 120). In some examples, the target vehicle orientation 542 can correspond to an angle associated with the data used to calibrate one or more sensors of the second target vehicle 542 (e.g., an angle used to adjust the calibration of a gyroscope, accelerometer, or the like, of the second target vehicle 510). More specifically, in some examples, the towing vehicle 120 can collect a gravity vector determined for the target vehicle 510 (e.g., during factory calibration of the second target vehicle 510) to determine the second target vehicle orientation 542, which it can then use to adjust the calibration of the second target vehicle 510 accordingly (e.g., to adjust, or offset, the calibration of one or more sensors of the second target vehicle 510 relative to the second vehicle orientation 542).

The calibration networking cable 530 can enable the transfer of power and/or information (e.g., data and/or machine-readable instructions) between towing vehicle 120 and one or more target vehicles transported by towing vehicle 120 (e.g., target vehicle 110 and second target vehicle 510). In some examples, the calibration networking cable 530 can enable the communication of power provided by the towing vehicle 120 to one or more target vehicles 110, 510 and it can allow the transfer of calibration data collected by one or more sensors of the target vehicles 110 and 510 during transport of the target vehicles 110 and 510 by the towing vehicle 120. Additionally, the calibration networking cable 530 can enable the communication of calibration settings, determined by the towing vehicle 120 based on the collected data, to one or more of the target vehicles 110 and 510.

FIG. 6 depicts an example method of calibrating a physical positioning system of a vehicle, in accordance with present implementations. At least one of the extrinsic calibration processor 220, the system processor 310, and/or the system processor 410, or any combination thereof, can perform method 600, but is not limited thereto. Accordingly, one or more of the steps may be performed, in some examples, by a different processor (or different number of processers), server, or any other computing device.

At 610, the method 600 can obtain first data indicating a positioning of an antenna of a location sensor of a first vehicle (e.g., the target vehicle 110). For example, the method can include the first data generated by the location sensor of the first vehicle (e.g., target vehicle 110) during a stationary state of the first vehicle preceding the movement of the first vehicle. At 612, the method 600 can obtain first data from a first vehicle at a second vehicle. At 614, the method 600 can obtain first data by a communication interface coupled with the first vehicle and the second vehicle.

At 620, the method 600 can obtain second data of the first vehicle indicating a physical location of the first vehicle. At 622, the method 600 can obtain second data from the first vehicle at the second vehicle by the communication interface. At 624, the method 600 can obtain second data during movement of the first vehicle caused by the second vehicle. For example, the method can include the second data generated by the location sensor of the first vehicle during the movement of the first vehicle. For example, the method can include generating, at the second vehicle during the movement of the first vehicle (e.g., at the towing vehicle 120 while it is physically transporting the target vehicle 110) and based on a fourth data of the first vehicle indicating a physical orientation of the first vehicle and fifth data of the first vehicle indicating a direction of gravity relative to a physical orientation of the first vehicle, sixth data corresponding to a calibration of the physical orientation of the first vehicle. Accordingly, the method can include obtaining, from the first vehicle at the second vehicle by the communication interface, the fourth data during the movement of the first vehicle. Similarly, the method may include obtaining, from the first vehicle at the second vehicle by the communication interface, the fifth data.

For example, the method can include the location sensor that can include a plurality of GPS antennas configured to detect a Global Positioning System (GPS) signal, the first data (e.g., the first data obtained at step 610 of method 600) corresponding to a distance between a first GPS antenna and a second GPS antenna among the GPS antennas, and the second data (e.g., the second data obtained at step 620 of method 600) can include one or more of a latitude, longitude, and altitude corresponding to the GPS signal.

At 630, the method 600 can generate third data for a calibration of the physical location of the first vehicle. For example, the method can include transmitting, from the second vehicle by the communication interface, the third data to a Global Positioning System (GPS) device of the first vehicle configured to measure the physical orientation of the first vehicle, the location sensor coupled with the GPS device. At 632, the method 600 can generate third data at the second vehicle. At 634, the method 600 can generate third data during the movement of the first vehicle. At 636, the method 600 can generate third data based on the first data. At 638, the method 600 can generate third data based on the second data.

The method 600 can include transmitting, during the movement of the first vehicle via the communication interface, electrical power from the second vehicle to the location sensor of the first vehicle (e.g., from the towing vehicle 120 to the location sensor of target vehicle 110 and while target vehicle 110 is physically transported by the towing vehicle 120) configured to measure the physical location of the first vehicle. The method can include activating, during the movement of the first vehicle and in response to the transmitting the electrical power, the location sensor.

For example, the method can include transmitting, from the second vehicle by the communication interface, the third data to an inertial measurement device of the first vehicle configured to measure the physical orientation of the first vehicle. For example, the method can include the first data generated by an accelerometer of the first vehicle during a stationary state of the first vehicle preceding the movement of the first vehicle. For example, the method can include the second data generated by a gyroscope of the first vehicle during the movement of the first vehicle.

For example, the method can include transmitting, during the movement of the first vehicle via the communication interface, electrical power from the second vehicle to an inertial measurement device of the first vehicle configured to measure the physical orientation of the first vehicle. The method can include activating, during the movement of the first vehicle and in response to the transmitting the electrical power, the inertial measurement device. For example, the method can include generating, at the second vehicle during the movement of the first vehicle and based on fourth data of the first vehicle indicating a physical location of the first vehicle and fifth data of the first vehicle indicating a positioning of a location sensor of the first vehicle, sixth data corresponding to a calibration of the physical location of the first vehicle. The method can include obtaining, from the first vehicle at the second vehicle by the communication interface, the fourth data during the movement of the first vehicle. For example, the method can include obtaining, from the first vehicle at the second vehicle by the communication interface, the fifth data.

For example, the method can include the location sensor comprising a plurality of GPS antennas configured to detect a Global Positioning System (GPS) signal, the fourth data can include one or more of a latitude, longitude, and altitude corresponding to the GPS signal, and the fifth data corresponding to a distance between a first GPS antenna and a second GPS antenna among the GPS antennas. For example, the method can include the second vehicle configured to generate, based on the first data and the second data, the third data during the movement of the first vehicle. For example, the method can include generating the first data by an accelerometer of the first vehicle during a stationary state of the first vehicle preceding the movement of the first vehicle. For example, the method can include generating the second data by a gyroscope of the first vehicle during the movement of the first vehicle.

For example, the method can include obtaining, during the movement of the first vehicle via the communication interface, electrical power from the second vehicle at an inertial measurement device of the first vehicle configured to measure the physical orientation of the first vehicle. The method can include activating, during the movement of the first vehicle and in response to the transmitting the electrical power, the inertial measurement device. For example, the method can include the second vehicle configured to generate, during the movement of the first vehicle and based on fourth data of the first vehicle indicating a physical location of the first vehicle and based on fifth data of the first vehicle indicating a positioning of a location sensor of the first vehicle, sixth data corresponding to a calibration of the physical location of the first vehicle. For example, the method can include transmitting, from the first vehicle to the second vehicle by the communication interface, the fourth data during the movement of the first vehicle. For example, the method can include transmitting, from the first vehicle to the second vehicle by the communication interface, the fifth data.

For example, the method can include the location sensor comprising a plurality of GPS antennas configured to detect a GPS signal, the fourth data can include one or more of a latitude, longitude, and altitude corresponding to the GPS signal, and the fifth data corresponding to a distance between a first GPS antenna and a second GPS antenna among the GPS antennas. For example, the system can include the processors further configured. The system can transmit, from the vehicle by the communication interface, the third data to an inertial measurement device of the external vehicle configured to measure the physical orientation of the external vehicle.

Having now described some illustrative implementations, the foregoing is illustrative and not limiting, having been presented by way of example. In particular, although many of the examples presented herein involve specific combinations of method acts or system elements, those acts and those elements may be combined in other was to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components. As used herein, the phrases "positioning system" and "inertial navigation system" are interchangeable.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both "A' and 'B'. Such references used in conjunction with "comprising" or other open terminology can include additional items. References to "is" or "arc" may be construed as nonlimiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Scope of the systems and methods described herein is thus indicated by the appended claims, rather than the foregoing description. The scope of the claims includes equivalents to the meaning and scope of the appended claims.

What is claimed is:

1. A method of calibration of a positioning system of a vehicle, the method comprising:
  obtaining, from a first vehicle at a second vehicle by a communication interface coupled with the first vehicle and the second vehicle, first data indicating a positioning of an antenna of a location sensor of the first vehicle;
  obtaining, from the first vehicle at the second vehicle by the communication interface, second data of the first vehicle indicating a physical location of the first vehicle, during movement of the first vehicle, the movement of the first vehicle caused by towing of the first vehicle by the second vehicle; and
  generating, at the second vehicle during the movement of the first vehicle and based on the first data and the second data, third data corresponding to a calibration of the physical location of the first vehicle.

2. The method of claim 1, further comprising:
  transmitting, from the second vehicle by the communication interface, the third data to a Global Positioning System (GPS) device of the first vehicle configured to measure the physical orientation of the first vehicle, the location sensor coupled with the GPS device.

3. The method of claim 1, the first data generated by the location sensor of the first vehicle during a stationary state of the first vehicle preceding the movement of the first vehicle.

4. The method of claim 1, the second data generated by the location sensor of the first vehicle during the movement of the first vehicle.

5. The method of claim 1, further comprising:
  transmitting, during the movement of the first vehicle via the communication interface, electrical power from the second vehicle to the location sensor of the first vehicle configured to measure the physical location of the first vehicle; and
  activating, during the movement of the first vehicle and in response to the transmitting the electrical power, the location sensor.

6. The method of claim 1, further comprising:
  generating, at the second vehicle during the movement of the first vehicle and based on fourth data of the first vehicle indicating a physical orientation of the first vehicle and fifth data of the first vehicle indicating a direction of gravity relative to a physical orientation of the first vehicle, sixth data corresponding to a calibration of the physical orientation of the first vehicle.

7. The method of claim 6, further comprising:
  obtaining, from the first vehicle at the second vehicle by the communication interface, the fourth data during the movement of the first vehicle.

8. The method of claim 6, further comprising:
  obtaining, from the first vehicle at the second vehicle by the communication interface, the fifth data.

9. The method of claim 6, the location sensor including a plurality of GPS antennas configured to detect a Global Positioning System (GPS) signal, the first data corresponding to a distance between a first GPS antenna and a second GPS antenna among the GPS antennas, and the second data including one or more of a latitude, longitude, and altitude corresponding to the GPS signal.

10. A system of calibration of a positioning system of a vehicle, the system comprising: a memory coupled with one or more processors configured to:
  obtain, from a first vehicle at a second vehicle by a communication interface coupled with the first vehicle and the second vehicle, first data indicating a positioning of an antenna of a location sensor of the first vehicle;
  obtain, from the first vehicle at the second vehicle by the communication interface, second data of the first vehicle indicating a physical location of the first vehicle, during movement of the first vehicle, the movement of the first vehicle caused by towing of the first vehicle by the second vehicle; and
  generate, at the second vehicle during the movement of the first vehicle and based on the first data and the second data, third data corresponding to a calibration of the physical location of the first vehicle.

11. The system of claim 10, the processors further configured to:
  transmit, from the second vehicle by the communication interface, third data to a Global Positioning System (GPS) device of the first vehicle configured to measure the physical orientation of the first vehicle, the location sensor coupled with the GPS device.

12. The system of claim 10, the first data generated by the location sensor of the first vehicle during a stationary state of the first vehicle preceding the movement of the first vehicle.

13. The system of claim 10, the second data generated by the location sensor of the first vehicle during the movement of the first vehicle.

14. The system of claim 10, the processors further configured to:
  transmit, during the movement of the first vehicle via the communication interface, electrical power from the second vehicle at the location sensor device of the first vehicle configured to measure the physical location of the first vehicle; and
  activate, during the movement of the first vehicle and in response to the transmitting the electrical power, the location sensor.

15. The system of claim 10, the processors further configured to:
  generate, at the second vehicle during the movement of the first vehicle and based on fourth data of the first vehicle indicating a physical orientation of the first vehicle and fifth data of the first vehicle indicating a direction of gravity relative to a physical orientation of the first vehicle, sixth data corresponding to a calibration of the physical orientation of the first vehicle.

16. The system of claim 15, the processors further configured to:

obtain, from the first vehicle at the second vehicle by the communication interface, the fourth data during the movement of the first vehicle.

17. The system of claim 15, the processors further configured to:

obtain, from the first vehicle at the second vehicle by the communication interface, the fifth data.

18. The system of claim 15, the location sensor including a plurality of GPS antennas configured to detect a Global Positioning System (GPS) signal, the first data corresponding to a distance between a first GPS antenna and a second GPS antenna among the GPS antennas, and the second data including one or more of a latitude, longitude, and altitude corresponding to the GPS signal.

19. A system of calibration of a positioning system of a vehicle, the system comprising:

a vehicle including a memory and one or more processors configured to:

obtain, from an external vehicle at the vehicle by a communication interface coupled with the vehicle and the external vehicle, first data indicating a positioning of an antenna of a location sensor of the external vehicle;

obtain, from the external vehicle at the vehicle by the communication interface, second data of the external vehicle indicating a physical location of the external vehicle, during movement of the external vehicle, the movement of the external vehicle caused by towing of the external vehicle by the vehicle; and generate, at the vehicle during the movement of the external vehicle and based on the first data and the second data, third data corresponding to a calibration of the physical location of the external vehicle.

20. The system of claim 19, the processors further configured to:

transmit, from the vehicle by the communication interface, the third data to a Global Positioning System (GPS) device of the external vehicle configured to measure the physical orientation of the external vehicle, the location sensor coupled with the GPS device.

* * * * *